United States Patent
Scarpino et al.

(10) Patent No.: US 9,602,280 B2
(45) Date of Patent: Mar. 21, 2017

(54) SYSTEM AND METHOD FOR CONTENT ENCRYPTION IN A KEY/VALUE STORE

(71) Applicant: FutureWei Technologies, Inc., Plano, TX (US)

(72) Inventors: Anthony Scarpino, Mountain View, CA (US); James Hughes, Palo Alto, CA (US)

(73) Assignee: Futurewei Technologies, Inc., Plano, TX (US)

( * ) Notice: Subject to any disclaimer, the term of this patent is extended or adjusted under 35 U.S.C. 154(b) by 325 days.

(21) Appl. No.: 13/798,746

(22) Filed: Mar. 13, 2013

(65) Prior Publication Data

US 2014/0270153 A1    Sep. 18, 2014

(51) Int. Cl.
  *H04L 9/28*   (2006.01)
  *H04L 29/06*  (2006.01)
  *H04L 9/08*   (2006.01)
  *H04L 29/08*  (2006.01)
  *H04L 9/06*   (2006.01)

(52) U.S. Cl.
  CPC .............. *H04L 9/28* (2013.01); *H04L 9/0822* (2013.01); *H04L 63/0435* (2013.01); *H04L 9/0637* (2013.01); *H04L 67/1097* (2013.01); *H04L 2463/062* (2013.01)

(58) Field of Classification Search
  CPC ..... H04L 63/0435; H04L 9/28; H04L 9/0822; H04L 67/1097; H04L 9/0637; H04L 2463/062
  See application file for complete search history.

(56) References Cited

U.S. PATENT DOCUMENTS

| | | | |
|---|---|---|---|
| 2006/0190715 A1* | 8/2006 | Miller | H04L 9/0822 713/150 |
| 2007/0106896 A1* | 5/2007 | Sandberg et al. | 713/170 |
| 2008/0063209 A1* | 3/2008 | Jaquette et al. | 380/284 |
| 2009/0282048 A1* | 11/2009 | Ransom | G06F 17/30094 |
| 2010/0142710 A1* | 6/2010 | Chrysler et al. | 380/277 |

OTHER PUBLICATIONS

"IEEE Standard for Wide-Block Encryption for Shared Storage Media" May 2011.*

* cited by examiner

Primary Examiner — Saleh Najjar
Assistant Examiner — Devin Almeida
(74) Attorney, Agent, or Firm — Slater Matsil, LLP

(57) ABSTRACT

System and method embodiments are provided for content encryption in a key/value store. The embodiments include encrypting both the key and value of client data blocks for storage so that the data can be retrieved reliability without compromising the key. An embodiment method includes obtaining a key from a data block comprising the key and a value, encrypting the key using a deterministic encryption algorithm with an encryption key to map the key to a cypher text in a one-to-one mapping, and encrypting the value using a second encryption algorithm to randomly map the value to a second cypher text. Encrypting both the key and the value provides more protection to the client data instead of encrypting only the value and leaving the key vulnerable without encryption. The encrypted key can also be protected from unauthorized access and from the owner of the database or the storage system.

20 Claims, 2 Drawing Sheets

SYSTEM AND METHOD FOR CONTENT ENCRYPTION IN A KEY/VALUE STORE

TECHNICAL FIELD

The present invention relates to storage technology, and, in particular embodiments, to a system and method for content encryption in a key/value store.

BACKGROUND

In some storage systems, such as distributed hash table (DHT), key/value store, and noSQL database systems, data is stored in the form of data objects or blocks, where each object includes a key and value. The key is used to identify the data object, and the value represents the data content. A data object may correspond to a single data structure or a set of data (e.g., a file or a set of files). Alternatively, the data object may correspond to a block or chunk of data, such as a portion of a file or a file from a set of files. The stored data objects can also be encrypted to provide protection against unauthorized users or access. Typically, the value is encrypted without the key since the key is used to identify the data object or value and is needed to successfully get or fetch the stored data objects in the storage system. An improved system is needed that provides better protection by encrypting both the value and the key.

SUMMARY OF THE INVENTION

In accordance with an embodiment, a method for content encryption in a key-value store includes obtaining a key from a data block comprising the key and a value, encrypting the key using a deterministic encryption algorithm with an encryption key to map the key to a cypher text in a one-to-one mapping, and storing the cypher text for the key in the key-value store In accordance with another embodiment, a method for content encryption in a key-value store includes obtaining a data block comprising a key and a value, encrypting the key using a deterministic encryption algorithm with an encryption key to map the key to a cypher text in a one-to-one mapping, encrypting the value using a second encryption algorithm to randomly map the value to a second cypher text, and storing the cypher text of the key and the second cypher text for the value in the key-value store.

In accordance with yet another embodiment, an apparatus for content encryption in a key-value store includes one or more storage nodes configured for storing one or more data blocks including key and value pairs, a processor, and a computer readable storage medium storing programming for execution by the processor. The programming includes instructions to obtain a data block comprising a key and a value, encrypt the key using a deterministic encryption algorithm with an encryption key to map the key to a cypher text in a one-to-one mapping, encrypt the value using a second encryption algorithm to randomly map the value to a second cypher text, and store the cypher text of the key and the second cypher text for the value in the key-value store.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Figure 1:
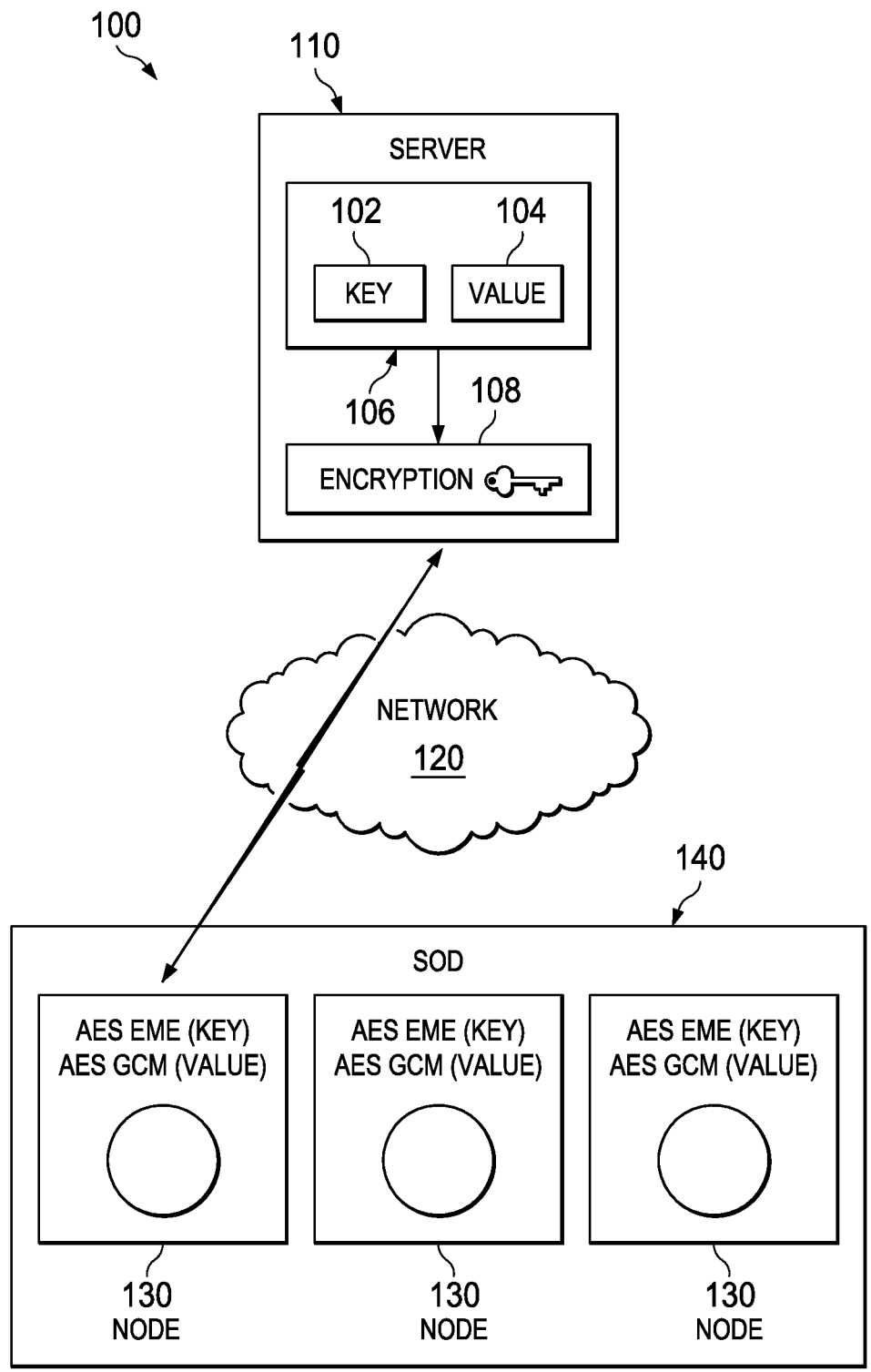
FIG. 1 illustrates an embodiment of a protection scheme for a key/value store system.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

System and method embodiments are provided for content encryption in a key/value store. The embodiments can also be implemented for any storage system that stores data objects or blocks comprising key and value pairs, such as DHT and noSQL database systems. The embodiments include encrypting both the key and value of client data blocks for storage so that the data can be retrieved reliability without compromising the key. Encrypting both the key and the value provides more protection to the client data, e.g., instead of encrypting only the value and leaving the key vulnerable without encryption. As such, the encrypted key can also be protected from unauthorized access and from the owner of the database or the storage system. Using two different encryption algorithms to encrypt the key and value further improves security and protection of stored data.

To guarantee successfully reproducing the key after encryption (retrieving the original key value by decrypting the encrypted key), a deterministic encryption algorithm, such as Advanced Encryption Standard (AES) $EME^2$, is used to encrypt the key. The original key is encrypted using the deterministic encryption algorithm with a secret value to guarantee the same encryption or cypher text for the key each time. The secret value also referred to herein as an encryption key or a secret key, is used with the algorithm to perform encryption on the original key and map the key to a cypher text (an encrypted key) in a one-to-one mapping. As such, the encryption key can be used to decrypt the encryption or cypher text to obtain the original key (the key before encryption). Obtaining the same encryption or cypher text each time when encrypting the original key guarantees that the reverse decryption process successfully reproduces the original key. Successfully reproducing the same original key ensures successfully returning the requested value associated with that key to the client and avoids returning a wrong value associated with an incorrectly reproduced key. The secret or encryption key may be provided by the system, e.g., a server or a key management system, instead of the client. The system can store securely the encryption key without sharing the encryption key with the client.

Further, the value can be encrypted using any suitable encryption algorithm, such as a Galois/Counter Mode (GCM), e.g., with the same encryption key used for encrypting the key or a different encryption key. A suitable encryption algorithm for the value may use a random operation (e.g., based on randomly generated values or vector) to generate an encryption or cypher text for the value. This makes it more difficult to guess the value encryption and therefore improves the security of the value encryption. However, such an encryption algorithm may not be suitable for encrypting the key, since the random operation provides less guarantee than a deterministic algorithm to reproduce the original key.

FIG. 1 shows an embodiment of a protection scheme 100 for a key/value store system. The key/value store system includes a server 110 and a plurality of storage nodes 130 coupled to the server 110, for instance via one or more networks 120 (e.g., the Internet). The server 110 is configured to encrypt data blocks 106 that include key 102 and value 104 pairs. The storage nodes 130 are configured to store the data blocks 106 including an encrypted key and value. Examples of a storage node 130 include as a hard disk, a flash memory card, a random access memory (RAM) device, a universal serial bus (USB) flash drive, or any other suitable storage device. The storage nodes 130 may be part of a sea of disk (SoD) architecture 140, which is suitable for providing data storage for cloud computing purposes. The SoD architecture 140 may comprise a case that includes a plurality of disks, each corresponding to a storage node 130. The disks may comprise a plurality of ATOM, ARM, and/or other processor type based computers. Each of the computers may also comprise other components, such as a Central Processing Unit (CPU), a random access memory (RAM), a Flash/Solid State Drive (SSD), a HDD, a one Gigabit per second (1G) Ethernet card, or combinations thereof. The key/value store system may be a localized or centralized storage system (e.g., in a data center), or alternatively a remote or distributed system across the Internet, other network, and/or multiple data centers.

The server 106 can encrypt the value 104 using any suitable encryption algorithm. The encryption algorithm for the value 104 may use a randomly generated vector that increases the likelihood of achieving different encrypted text or value for different values 104. The key 102 is encrypted using a second encryption algorithm that is deterministic in nature and that guarantees reproducing (in the decryption process) the same original key 102 using the same secret or encryption key 108. Each different key 102 associated with a different value 104 and data block 106 is encrypted using the deterministic encryption algorithm with a selected encryption key 108. The deterministic encryption and decryption scheme ensures retrieving the same original key 102 and hence retrieving the correct value 104 associated with that key 102.

In an embodiment, the key 102 is encrypted using the AES EME$^2$ algorithm, which is a deterministic algorithm with the characteristics described above. A corresponding decryption algorithm can then be used to reproduce the key 102. The value 106 can be encrypted using the GCM algorithm that provides security and data block integrity.

The secret or encryption key 108 may be generated by the server 110 or a key management system. A different encryption key may be generated for each client. The different encryption keys for the different clients may be used with the deterministic encryption algorithm to encrypt the same key of the same data block to obtain different corresponding encryptions of cypher texts of the same key. The different cypher texts can then be decrypted using a deterministic decryption algorithm (corresponding to the deterministic encryption algorithm) with the corresponding encryption keys to retrieve the same original key of the data block. The system may store the generated encryption keys 108, for example in a mapping table that maps the encryption keys 108 to clients. The encryption keys 108 may be kept from the clients by the system and used to decrypt the stored and encrypted key/value pair (stored data block) when the client requests the data block. Thus, the encryption and decryption process and the use of the secret or encryption keys 108 may be handled by the system and, from a processing perspective, transparent to the client end.

The key 102 and the value 104 may be encrypted (and decrypted) using different algorithms, as described above, but with the same encryption key 108. Alternatively, different algorithms and encryption keys 108 are used to encrypt/decrypt the key 102 and value 104. Further, the same secret or encryption o key 108 can be used to encrypt different values 104 and/or different keys 102 for different data blocks 106. The system may have a mapping table that maps the encryption keys 108 to clients.

Figure 2:
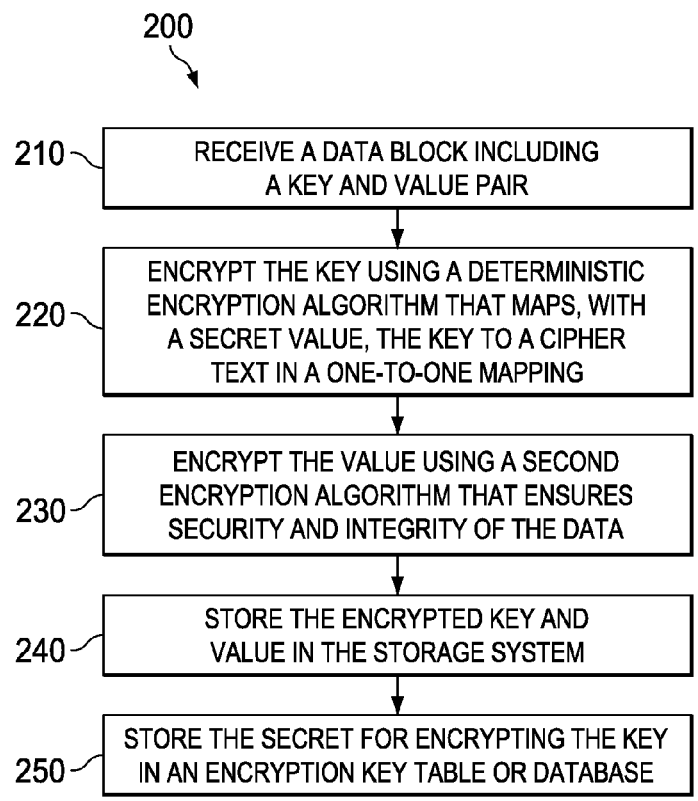
FIG. 2 is an embodiment of a key/value pair encryption method for a key/value store system.
Figure 3:
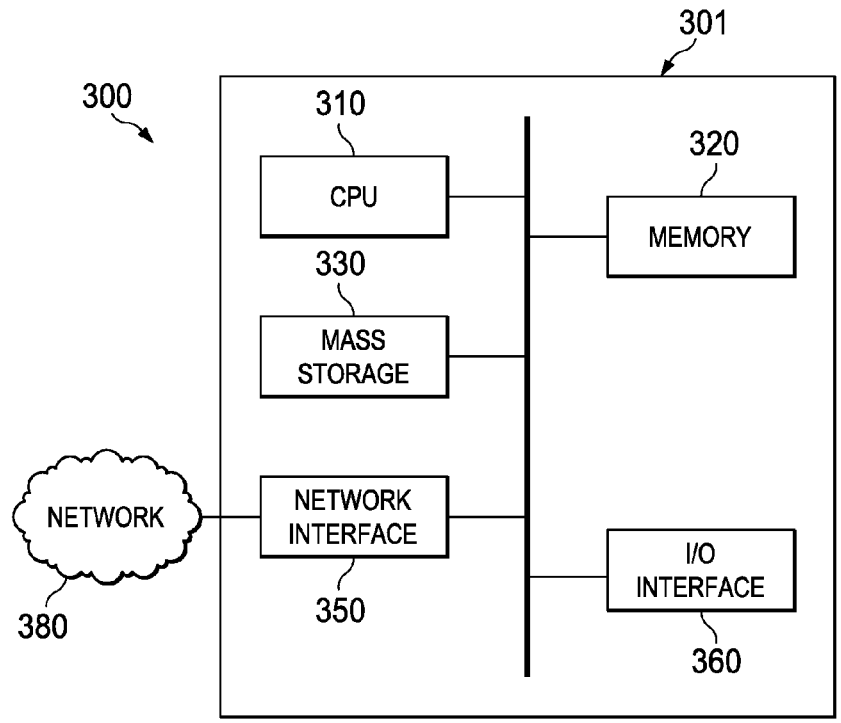
FIG. 3 is a processing system that can be used to implement various embodiments.

FIG. 2 shows an embodiment of a key/value pair encryption method 200 for a key/value store system. The key/value pair encryption method 200 can be implemented in the same key/value store system above (in FIG. 1), e.g., during or after the process of storing data blocks. For instance, the key and value pair can be encrypted during the storing process of the data block or alternatively after the data block has been stored (in a background process). The encryption method 200 guarantees data integrity and security and further guarantees no duplicate keys upon the decryption of different data blocks, which ensures retrieving the correct value and data block.

At step 210, a data block including a key and value pair is obtained. The data block may be sent for storage or may be already stored in the system. At step 220, the key of the data block is encrypted using a deterministic encryption algorithm that maps, with a secret value, the key to a cypher text (an encrypted key) in a one-to-one mapping. At step 230, the value of the data block is encrypted using a second encryption algorithm that ensures security and integrity of the data. At step 340, the encrypted key and value are stored in the storage system. At step 350, the secret for encrypting the key is also stored in an encryption key table or database.

FIG. 4 is a block diagram of a processing system 400 that can be used to implement various embodiments. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system 400 may comprise a processing unit 401 equipped with one or more input/output devices, such as a network interfaces, storage interfaces, and the like. The processing unit 401 may include a central processing unit (CPU) 410, a memory 420, a mass storage device 430, and an I/O interface 460 connected to a bus. The bus may be one or more of any type of several bus architectures including a memory bus or memory controller, a peripheral busor the like.

The CPU 410 may comprise any type of electronic data processor. The memory 420 may comprise any type of system memory such as static random access memory (SRAM), dynamic random access memory (DRAM), synchronous DRAM (SDRAM), read-only memory (ROM), a combination thereof, or the like. In an embodiment, the memory 420 may include ROM for use at boot-up, and DRAM for program and data storage for use while executing programs. In embodiments, the memory 420 is non-transitory. The mass storage device 430 may comprise any type of storage device configured to store data, programs, and other information and to make the data, programs, and other information accessible via the bus. The mass storage device 430 may comprise, for example, one or more of a solid state drive, hard disk drive, a magnetic disk drive, an optical disk drive, or the like.

The processing unit 401 also includes one or more network interfaces 450, which may comprise wired links, such as an Ethernet cable or the like, and/or wireless links to access nodes or one or more networks 480. The network interface 450 allows the processing unit 401 to communicate with remote units via the networks 480. For example, the network interface 450 may provide wireless communication via one or more transmitters/transmit antennas and one or more receivers/receive antennas. In an embodiment, the processing unit 401 is coupled to a local-area network or a wide-area network for data processing and communications with remote devices, such as other processing units, the Internet, remote storage facilities, or the like.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method for content encryption in a key-value store, the method comprising:
    obtaining a key from a data block comprising the key and a value, the key and the value forming a key-value pair such that the key provides an index for retrieving data associated with the value from the key-value store;
    encrypting the key in the key-value pair using a deterministic encryption algorithm with a first encryption key to map the key to a first cypher text in a one-to-one mapping, the first encryption key being different than the key in the key-value pair, wherein the deterministic encryption algorithm provides a guarantee that the key is reproducible from the first cipher text using the first encryption key; and
    storing the first cypher text for the key in the key-value store;
    encrypting the value in the key-value pair using a random encryption algorithm with a second encryption key to randomly map the value to a second cypher text, the second encryption key being different than both the first encryption key and the key in the key-value pair, wherein the random encryption algorithm does not provide a guarantee that the value is reproducible from the second cypher text using the second encryption key; and
    storing the second cypher text of the value with the first cypher text of the key in the key-value store.

2. The method of claim 1, wherein the deterministic encryption algorithm with the first encryption key maps the key each time to the same cypher text.

3. The method of claim 1, further comprising:
    retrieving the first cypher text of the key from the key-value store; and
    decrypting the first cypher text using a decryption algorithm corresponding to the deterministic encryption algorithm with the first encryption key to map the first cypher text to the key.

4. The method of claim 1 further comprising encrypting the key using the deterministic encryption algorithm with a third encryption key to map the key to a third cypher text in a one-to-one mapping.

5. The method of claim 4, further comprising:
    retrieving the first cypher text and the third cypher text from the key-value store;
    decrypting the first cypher text using a decryption algorithm corresponding to the deterministic encryption algorithm with the first encryption key to map the first cypher text to the key; and
    decrypting the third cypher text using the decryption algorithm corresponding to the deterministic encryption algorithm with the third encryption key to map the third cypher text to the key,
    wherein the first encryption key is used for a first client associated with the data block, and wherein the third encryption key is used for a second client associated with same data block.

6. The method of claim 1, wherein the random encryption algorithm maps the value each time to a different encryption for the value.

7. The method of claim 1, further comprising:
    retrieving the first cypher text of the key and the second cypher text for the value from the key-value store;
    decrypting the first cypher text using a decryption algorithm corresponding to the deterministic encryption algorithm with the first encryption key to map the first cypher text to the key; and
    decrypting the second cypher text using a second decryption algorithm corresponding to the random encryption algorithm to map the second cypher text to the value.

8. A method for content encryption in a key-value store, the method comprising:
    obtaining a data block comprising a key and a value, the key and the value forming a key-value pair such that the key provides an index for retrieving data associated with the value from the key-value store;
    encrypting the key in the key-value pair using a deterministic encryption algorithm with an encryption key to map the key to a first cypher text in a one-to-one mapping, wherein the deterministic encryption algorithm provides a guarantee that the key is reproducible from the first cipher text using the first encryption key;
    encrypting the value in the key-value pair using a random encryption algorithm and the encryption key to randomly map the value to a second cypher text, wherein the random encryption algorithm does not provide a guarantee that the value is reproducible from the second cypher text using the second encryption key; and
    storing the first cypher text of the key and the second cypher text for the value in the key-value store.

9. The method of claim 8, wherein the deterministic encryption algorithm with the encryption key maps the key each time to the same cypher text, and wherein the random encryption algorithm maps the value each time to a different cypher text for the value.

10. The method of claim 8, wherein the deterministic encryption algorithm is an Advanced Encryption Standard (AES) $EME^2$ algorithm.

11. The method of claim 8, wherein the random encryption algorithm is a Galois/Counter Mode (GCM) algorithm.

12. The method of claim 8, wherein the data block is obtained from a client, and wherein the key and the value are encrypted before storing the data block.

13. The method of claim 8, wherein the data block is a previously stored data block obtained from the key-value store, and wherein the key is restored in the key-value store.

14. An apparatus for content encryption in a key-value store, the apparatus comprising:
    one or more storage nodes configured for storing one or more data blocks including key and value pairs;
    a processor; and a computer readable storage medium storing programming for execution by the processor, the programming including instructions to:
obtain a data block comprising a key and a value, the key and the value forming a key-value pair such that the key provides an index for retrieving data associated with the value from the key-value store;
encrypt the key in the key-value pair using a deterministic encryption algorithm with a first encryption key to map the key to a first cypher text in a one-to-one mapping, the first encryption key being different than the key in the data block, wherein the deterministic encryption algorithm provides a guarantee that the key is reproducible from the first cipher text using the first encryption key;
encrypt the value in the key-value pair using a random encryption algorithm and a second encryption key to randomly map the value to a second cypher text, the second encryption key being different than both the first encryption key and the key in the key-value pair, wherein the random encryption algorithm does not provide a guarantee that the value is reproducible from the second cypher text using the second encryption key; and
store the first cypher text of the key and the second cypher text of the value in the key-value store.

15. The apparatus of claim 14, wherein the programming includes further instructions to:
encrypt the key using the deterministic encryption algorithm with a third encryption key to map the key to a third cypher text in a one-to-one mapping, the third encryption key being different than both the first encryption key and the key in the key-value pair.

16. The apparatus of claim 15 further comprising a key management entity configured to generate the first encryption key and the third encryption key for different corresponding clients associated with the same data block and map the first encryption key and the third encryption key to the different corresponding clients in a table or database.

17. The apparatus of claim 16, wherein the first encryption key and the third encryption key are kept hidden from the clients.

18. An apparatus for content encryption in a key-value store, the apparatus comprising:
one or more storage nodes configured for storing one or more data blocks including key and value pairs;
a processor; and
a computer readable storage medium storing programming for execution by the processor, the programming including instructions to:
obtain a data block comprising a key and a value, the key and the value forming a key-value pair such that the key provides an index for retrieving data associated with the value from the key-value store;
encrypt the key in the key-value pair using a deterministic encryption algorithm with a first encryption key to map the key to a first cypher text in a one-to-one mapping, the first encryption key being different than the key in the data block;
encrypt the value in the key-value pair using a random encryption algorithm and a second encryption key to randomly map the value to a second cypher text, the second encryption key being different than both the first encryption key and the key in the key-value pair; and
store the first cypher text of the key and the second cypher text of the value in the key-value store,
wherein the deterministic encryption algorithm maps the key to the same cypher text each time the key is encrypted using the deterministic encryption algorithm with the first encryption key, and wherein the random encryption algorithm maps the value to a different cypher text each time the value is encrypted using the random encryption algorithm with the second encryption key.

19. A method for content encryption in a key-value store, the method comprising:
obtaining a key from a data block comprising the key and a value, the key and the value forming a key-value pair such that the key provides an index for retrieving data associated with the value from the key-value store;
encrypting the key in the key-value pair using a deterministic encryption algorithm with a first encryption key to map the key to a first cypher text in a one-to-one mapping, the first encryption key being different than the key in the key-value pair; and
storing the first cypher text for the key in the key-value store;
encrypting the value in the key-value pair using a random encryption algorithm with a second encryption key to randomly map the value to a second cypher text, the second encryption key being different than both the first encryption key and the key in the key-value pair; and
storing the second cypher text of the value with the first cypher text of the key in the key-value store,
wherein the deterministic encryption algorithm maps the key to the same cypher text each time the key is encrypted using the deterministic encryption algorithm with the first encryption key, and wherein the random encryption algorithm maps the value to a different cypher text each time the value is encrypted using the random encryption algorithm with the second encryption key.

20. The method of claim 8, wherein the deterministic encryption algorithm maps the key to the same cypher text each time the key is encrypted using the deterministic encryption algorithm with the encryption key, and wherein the random encryption algorithm maps the value to a different cypher text each time the value is encrypted using the random encryption algorithm with the encryption key.

* * * * *